(12) United States Patent
Lebaudy et al.

(10) Patent No.: US 6,571,712 B2
(45) Date of Patent: Jun. 3, 2003

(54) ELECTROPYROTECHNIC IGNITER WITH TWO IGNITION HEADS AND USE IN MOTOR VEHICLE SAFETY

(75) Inventors: Franck Lebaudy, Loperhet (FR); Christian Perotto, Ergue-Gaberic (FR)

(73) Assignee: Livbag S.N.C., Vert le Petit (FR)

( * ) Notice: Subject to any disclaimer, the term of this patent is extended or adjusted under 35 U.S.C. 154(b) by 0 days.

(21) Appl. No.: 09/918,193

(22) Filed: Jul. 30, 2001

(65) Prior Publication Data

US 2002/0020320 A1 Feb. 21, 2002

(30) Foreign Application Priority Data

Aug. 17, 2000 (FR) .............................................. 00 10686

(51) Int. Cl.[7] .............................. F42B 3/10; F42B 3/12; F42C 11/00; F42C 19/12; F42C 21/00; F23Q 7/02
(52) U.S. Cl. ................................ 102/202.5; 102/202.7; 102/202.9; 102/202.12; 102/202.14; 102/206
(58) Field of Search ........................... 102/202.5, 202.9, 102/202.12, 202.14

(56) References Cited

U.S. PATENT DOCUMENTS

| 5,241,910 | A | * | 9/1993 | Cunningham et al. ... 102/202.9 |
|---|---|---|---|---|
| 5,254,838 | A | | 10/1993 | Hasegawa et al. .......... 219/270 |
| 5,639,986 | A | * | 6/1997 | Evans ..................... 102/202.9 |
| 6,068,291 | A | | 5/2000 | Lebaudy et al. ............ 280/736 |
| 6,079,739 | A | | 6/2000 | Perotto et al. .............. 280/736 |
| 6,155,171 | A | * | 12/2000 | Haegeman et al. ...... 102/202.9 |
| 6,230,624 | B1 | * | 5/2001 | Chatley, Jr. et al. ..... 102/202.7 |
| 6,289,813 | B1 | * | 9/2001 | Duguet et al. .......... 102/202.5 |
| 6,340,175 | B1 | * | 1/2002 | Hughes et al. ............. 280/741 |
| 6,418,853 | B1 | * | 7/2002 | Duguet et al. .............. 102/206 |

FOREIGN PATENT DOCUMENTS

| DE | 19653115 | 6/1998 |
|---|---|---|
| EP | 0382552 | 8/1990 |
| FR | 2772909 | 6/1999 |
| WO | 0009366 | 2/2000 |

* cited by examiner

Primary Examiner—Michael J. Carone
Assistant Examiner—H. A. Blackner
(74) Attorney, Agent, or Firm—Bucknam And Archer

(57) ABSTRACT

There is disclosed an electropyrotechnic igniter which contains two ignition heads each having a body containing a resisitive heating element and a pyrotechnic ignition composition. The two ignition heads also include a means of dialogue and of triggering coded information and a means of storing electrical energy. The igniter also includes external connection means intended to be connected electrically to an electronic control unit. The igniter is intended to be used in motor vehicle safety, particular to constitute the ignition device of a gas generator associated with an airbag.

9 Claims, 5 Drawing Sheets

ELECTROPYROTECHNIC IGNITER WITH TWO IGNITION HEADS AND USE IN MOTOR VEHICLE SAFETY

BACKGROUND OF THE INVENTION

The present invention relates to the field of motor vehicle safety and deals, on the one hand, with an electropyrotechnic igniter and, on the other hand, with a pyrotechnic gas generator containing such an igniter, for inflating an airbag.

New generators known as "adaptive generators" have appeared recently with a view to limiting the risks of bodily injury caused by the deployment of the airbag. To do that, these various generators, coupled with appropriate detection systems, make it possible to alter the gas flow rate and/or the gas volume as a function of certain parameters, such as, for example, the morphology and the position of the passenger, the ambient temperature, the nature and the intensity of the impact. These generators are connected to an electronic control unit and generally have two combustion chambers, separated from one another by a sealed partition, each of which has its own pyrotechnic charge and its own ignition system. Each of the two ignition systems is then positioned at one of the opposite ends of the generator. Patent Application EP 0 382 552 describes a generator of this type.

In order to reduce the number of electrical connections between the electronic control unit and the generator, it has therefore been proposed, in Patent Application WO 97/16695 and in French Patent Application FR 2 763 548, for the two separate ignition systems to be replaced by an electropyrotechnic initiator with two ignition heads which is connected to the said electronic control unit via a single electrical supply. According to a first embodiment of this initiator, the latter contains two separate resistive heating elements incorporated in a switching bridge comprising four switches which can switch in pairs and which are combined with a routing circuit produced by a diode circuit. According to a second embodiment of this initiator, the latter comprises two different resistors mounted in parallel in an electric circuit. However, motor vehicle manufacturers wish, for safety reasons, to be able at any instant to check the value of each resistive element included in the initiator by successively passing electrical test currents generated using the electronic control unit. However, because, in the first embodiment of the initiator, the junction voltage of the diodes used is too high and depends on the temperature, it is very difficult to measure the value of the said resistive elements reliably. In the second embodiment of the initiator, in order to be able to test each of the two resistors, it is therefore necessary, because these resistors have different resistances, to vary the strength of the electrical current delivered by the electronic control unit. This is relatively complicated to do and, in addition, the use of two different resistors increases the number of steps needed in assembling the initiator and therefore the manufacturing costs.

An initiator has therefore been proposed, as described in French Patent Application FR 2 772 909, with two ignition heads comprising two resistive heating elements incorporated into an electric circuit which comprises three electrical connections, one being common to the two resistive elements and the other two each being connected to just one of the two resistive heating elements.

Nonetheless, given the great increase in the number of "airbag modules" incorporated into a motor vehicle, an "airbag module" consisting of a particular entity containing a gas generator associated with an airbag, the person skilled in the art, aside from being faced with a proliferation in the number of electrical connections, has noted that in the event of a collision, the electronic control unit was unable to deliver enough electrical energy to bring about the desired triggering of the various ignition systems included in the airbag modules.

In addition, depending on the nature and intensity of the impact, for example, it is desirable to be able to trigger only the appropriate airbag modules that will afford appropriate protection and therefore, in each airbag module finally adopted for protection, to be able to give totally different commands to each of the two ignition heads.

The person skilled in the art is still looking for an electropyrotechnic igniter with two ignition heads that makes it possible to overcome the aforementioned problems. Added to these are also the constraints associated with cost and bulk.

SUMMARY OF THE INVENTION

The object of the present invention is precisely to propose such an igniter and relates therefore to an electropyrotechnic igniter with two ignition heads, each of the said ignition heads comprising a body containing a resistive heating element and a pyrotechnic ignition composition, characterized in that i) each of the two ignition heads comprises a means of dialogue and of triggering coded information and a means of storing electrical energy, ii) the said igniter comprises external connection means intended to be connected electrically to an electronic control unit.

It therefore follows that the use of such an igniter in each of the various airbag modules incorporated into the vehicle and connected by a wired network of the bus type with an electronic control unit makes it possible, on the one hand, to leave the choice to the electronic control unit and to trigger only one or both of the two ignition heads included in the airbag module or modules likely to afford the occupant effective protection depending on the impact, and, on the other hand, to no longer ask the electronic control unit to deliver the amount of electrical energy needed to initiate such an igniter. This is achieved by virtue of the presence, in each of the two ignition heads of the igniter, on the one hand, of a means of storing electrical energy which is periodically supplied with low-strength electric current emitted by the electronic control unit and, on the other hand, of a dialogue and triggering means which is capable of detecting coded information from the electronic control unit and of giving the command to the said means of storing electrical energy to make it deliver the amount of electrical energy hitherto stored. This energy makes it possible to heat the resistive heating element through the Joule effect, so as to initiate the pyrotechnic ignition composition.

As a preference, the dialogue and triggering means will be a specific integrated circuit and the coded information which flows between the electronic control unit and the said dialogue and triggering means will consist of strings of specific electrical pulses. In the current application, the coded information will comprise both information constituting the command to trigger the two ignition heads of the igniter and information allowing the electronic control unit to satisfy itself of the reliability of the electronic components contained in each of the two ignition heads of the igniter.

Advantageously, in each of the two ignition heads, a transverse dividing wall splits the interior of the body into, on the one hand, a downstream chamber containing the resistive heating element and the pyrotechnic ignition composition, and, on the other hand, an upstream chamber containing an electronic board onto which the dialogue and triggering means and the means of storing electrical energy are integrated.

Advantageously also, in each of the two ignition heads, electrical connection means pass through the transverse dividing wall and connect the resistive heating element to conducting tracks which are formed on the electronic board. As a preference, the transverse dividing wall is made using a metal part having several perforations, each of these perforations having a glass side wall. Advantageously, the metal part has two perforations and the electrical connection means consist of two metal connecting pins, each inserted into one of the two perforations borne by the metal part and having a first end attached to the resistive heating elements and a second end soldered to the conducting tracks. This transverse dividing wall therefore provides sealing between the upstream chamber and the downstream chamber before and after the ignition head is operated and also electrically isolates the metal connecting pins from one another.

As a preference, the two electronic boards are arranged at right angles to their respective transverse dividing wall. To improve the mechanical strength of the said electronic boards and of the electronic components fixed on them, it is desirable for the assembly to be covered with overmoulding or a coating.

Advantageously, in each of the two ignition heads, the dialogue and triggering means is placed on one of the two flat faces of the electronic board, and the means of storing electrical energy is placed on the other flat face.

Advantageously, the external connection means consist of external metal pins, each of which has, on the one hand, a first part which is arranged in the continuation of the two electronic boards and which is parallel to these electronic boards, and, on the other hand, a second part which is at right angles to the first part.

As a preference, the resistive heating elements each consist of a thin-film resistive bridge, the latter consisting of tantalum nitride, the thickness of which is between 0.01 $\mu$m and 1 $\mu$m. The resistive bridge could just as easily consist, for example, of a layer of a nickel/chromium alloy, the thickness of which is between 0.01 $\mu$m and 1 $\mu$m.

The invention also relates to the use of such an electropyrotechnic igniter in a gas generator which is intended to inflate an airbag and which has an elongate tubular body. This igniter is then preferably fixed into the central part of the generator body, that is to say between the two combustion chambers thereof, and itself provide thermal and mechanical isolation between these two combustion chambers.

DESCRIPTION OF THE DRAWINGS

There will be described hereinafter in FIGS. 1 to 4 two preferred embodiments of the igniter and, in FIG. 5, a gas generator containing an igniter according to the invention.

DETAILED DESCRIPTION OF THE INVENTION

Figure 1:
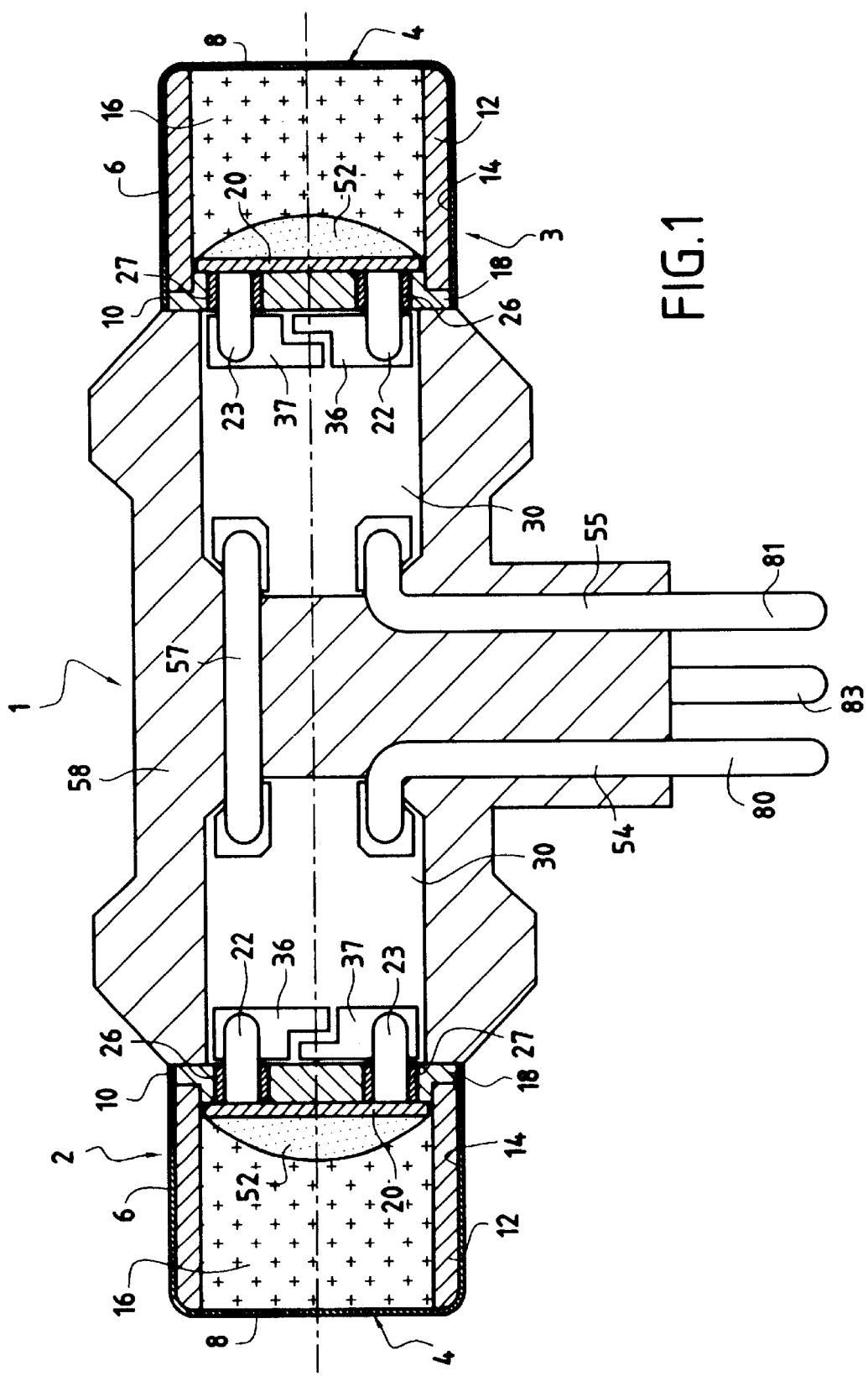
FIG. 1 is a part view in longitudinal section of an electropyrotechnic igniter equipped with three external metal pins, with the electronic components and part of the overmoulding omitted.
Figure 2:
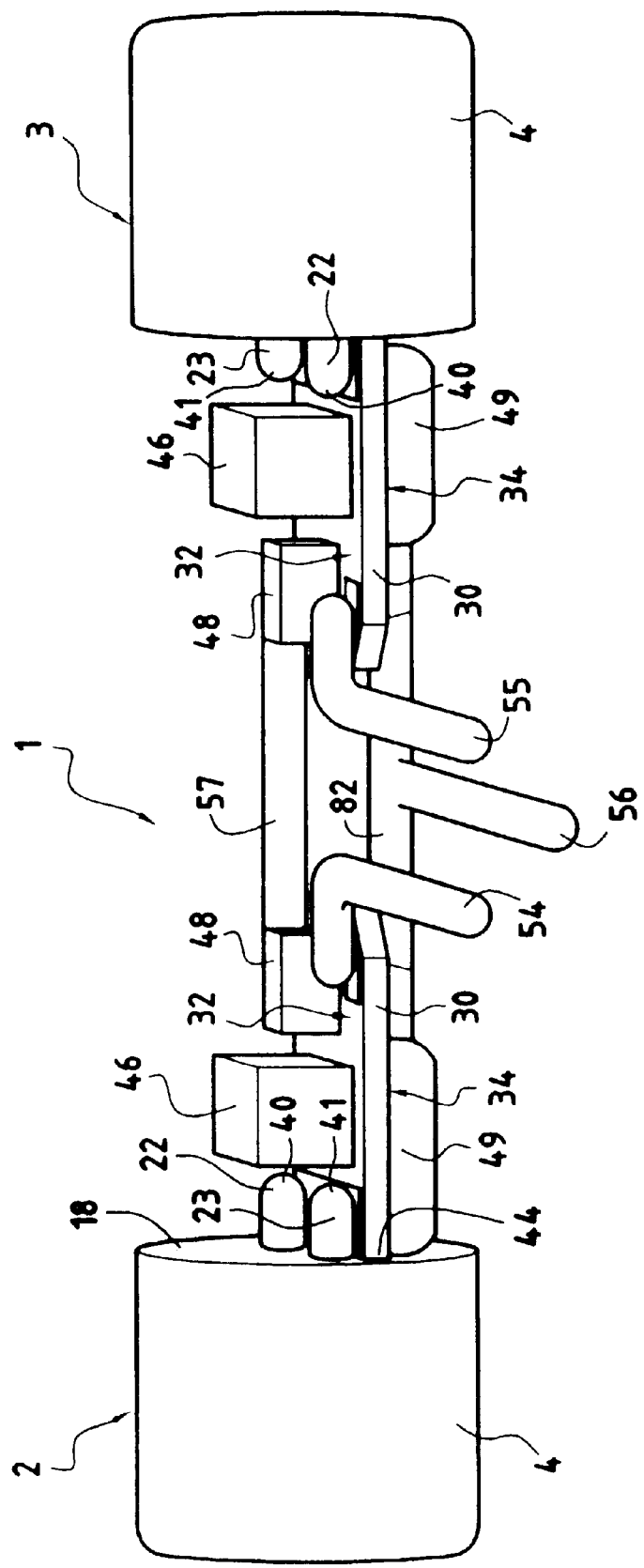
FIG. 2 is a perspective view with cutaway of the igniter depicted partly in FIG. 1, with the overmoulding omitted.

Referring to FIGS. 1 and 2, it can be seen that an igniter 1 according to the invention comprises two ignition heads 2, 3 each of which is produced identically, independently of one another, and which are then connected to each other. These two ignition heads 2, 3 consist of a cap 4 which has a side wall 6 ending, on the one hand, in an end wall 8 and, on the other hand, in a free end 10, and into which is first of all inserted a cylindrical liner 12. The latter has a first end resting against the end wall 8 of the cap 4 and a side wall 14, the exterior surface of which is in contact with part of the interior surface of the side wall 6 of the cap 4. A pyrotechnic ignition composition 16 in the form of a pulverulent substance is then introduced into the cap 4. An assembly, described hereinbelow, is finally slipped into the said cap 4.

This assembly is made from a glass penetration which, on the one hand, comprises a discoid metal part 18 having an upstream face and a downstream face to which a resistive heating element 20 is attached and, on the other hand, two metal connecting pins 22, 23. More specifically, the discoid metal part 18 has two perforations each having a glass side wall 26, 27, the two metal connecting pins 22, 23 are each introduced into one of the two perforations and the said pins 22, 23 each have a first end soldered to the resistive heating element 20. The latter is advantageously made using a thin-film resistive bridge consisting of tantalum nitride, the thickness of which is about 0.5 $\mu$m. A printed circuit support, in the form of a rectangular electronic board 30 having an upper flat face 32 and a lower flat face 34 on which faces conducting tracks 36, 37 are formed, is attached to the connecting pins 22, 23. More specifically, the second end 40, 41 of each of the two connecting pins 22, 23 is soldered to the conducting tracks 36, 37 on the flat upper face 32 so that the edge face 44 of the rectangular electronic board 30 is in contact with the upstream face of the discoid metal part 18. A means 46 of storing electrical energy, which consists of a capacitor, and means 48 of protection against electrostatic discharge and against electromagnetic interference are connected to the conducting tracks 36, 37 on the flat upper face 32 and a means 49 of dialogue and of triggering a string of specific electronic pulses is connected to the conducting tracks 36, 37 on the flat lower face 34. This dialogue and triggering means 49 is advantageously produced using a specific integrated circuit. A pyrotechnic priming composition 52 in the form of a lacquer based on lead tri-resorcinate is deposited on the resistive heating element 20 and the assembly as described above is introduced into the cap 4, the discoid metal part 18 being placed resting against the second end of the cylindrical liner 12 and the free end 10 of the cap 4 finally being fixed by laser-welding to the said discoid metal part 18.

The two ignition heads 2, 3 are then connected to one another by connecting pins 54 to 57. More specifically, the external pin 54 has, on the one hand, a first end which is connected to the conducting tracks 36, 37 of the electronic board 30 of the ignition head 2 and which lies in the continuation of the said electronic board 30 and, on the other hand, a second end 80 which lies in a plane at right angles to the plane in which the first end is contained. The same is true of the external pin 55 which has a first end connected to the conducting tracks 36, 37 of the electronic board 30 of the ignition head 3 and a second end 81 at right angles to the first. The external pin 56 comprises, on the one hand, a first part 82 ending at a first end attached to the electronic board 30 of the ignition head 2 and at a second end attached to the electronic board 30 of the ignition head 3 and, on the other hand, a second part 83 which is arranged in a plane at right angles to the plane in which the first part 82 lies. This second part 83 of the pin 56 and the second end 80, 81 of the two pins 54, 55 are intended to be connected, by means of a connector, to an electronic control unit. The pin 56 is intended to provide earthing and the internal pin 57 allows the conducting tracks 36, 37 of the electronic board 30 of the ignition head 2 to be connected electrically to the conducting tracks 36, 37 of the electronic board 30 of the ignition head 3.

A first overmoulding 58 is produced and coats, on the one hand, the two electronic boards 30 and the various electronic components fixed on them and, on the other hand, the connecting pins 54 to 57.

Figure 5:
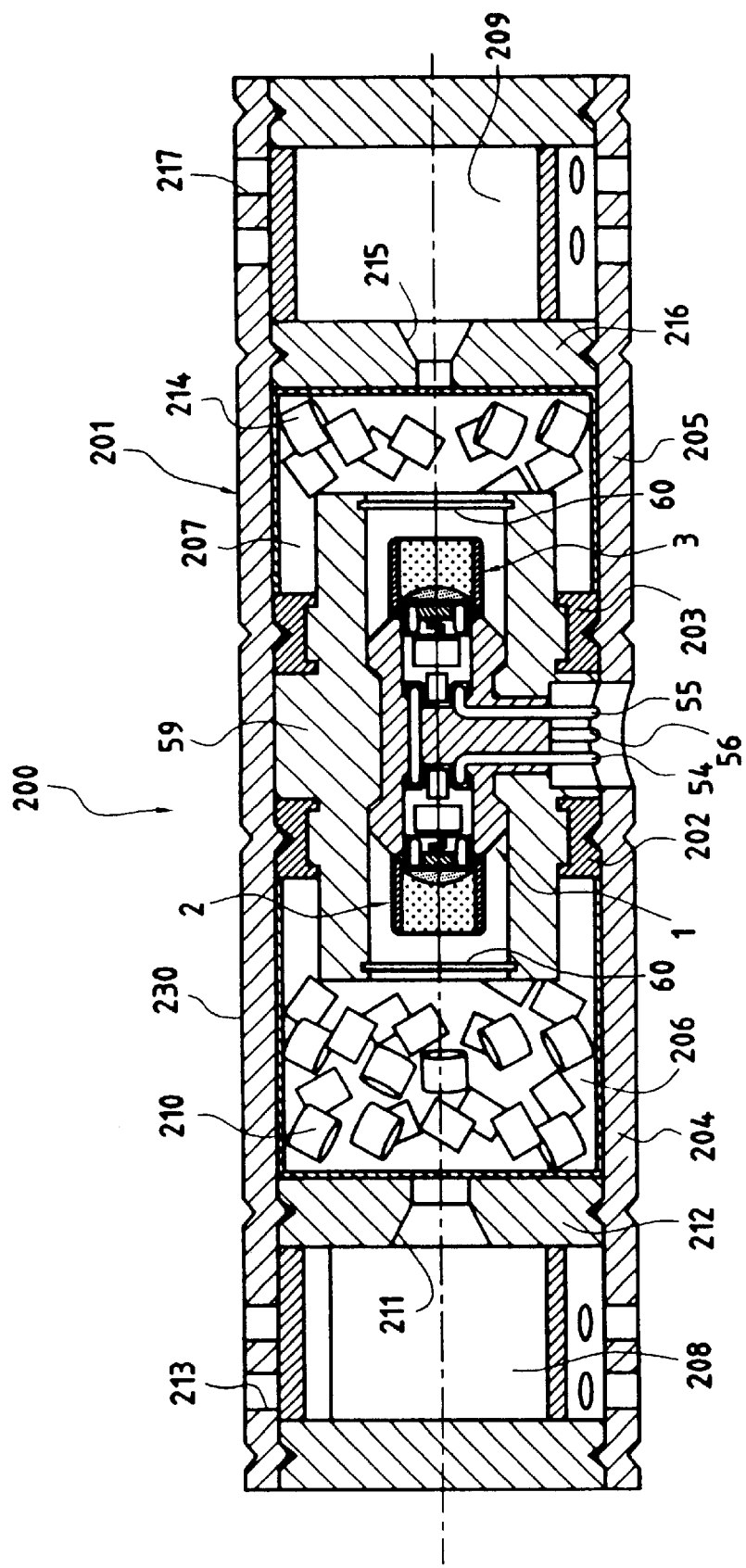
FIG. 5 is a view in longitudinal section of a gas generator containing, in its central part, the igniter that is the subject of FIG. 1.

Thereafter, as can be seen in FIG. 5, a second overmoulding 59 is produced which has, on the one hand, a central bore leaving space for the connector coming from the electronic control unit and, on the other hand, two opposite ends in each of which is formed a groove to hold a discoid glass wall 60.

It is also possible for the space left empty between the cap 4 and the discoid glass wall 60 to be filled with a strengthening powder.

An electropyrotechnic igniter 1 as described above operates as follows.

Under normal operating conditions, that is to say when the motor vehicle into which the said igniter 1 is incorporated is not experiencing any particular accident requiring the deployment of an airbag in order to protect the occupant, the two means 46 of storing electrical energy, which are positioned one on the ignition head 2 and the other on the ignition head 3 and which here consist of capacitors, are regularly powered with low-intensity current emitted by the electronic control unit and transmitted to the said capacitors via the external pins 54 and 55.

When, for example depending on the nature and intensity of the impact, activation of just one of the two ignition heads 2, 3 will suffice, the electronic control unit delivers a triggering command in the form of a train of specific electrical pulses which can be detected only by the dialogue and triggering means 49 of the ignition head that has been chosen. When it is necessary to activate both ignition heads 2, 3, the electronic control unit then delivers the specific electrical pulse trains to both dialogue and triggering means 49.

In any event, each dialogue and triggering means 49 finally adopted calls upon the capacitor associated with it and which is therefore caused to release, into the two connecting pins 22, 23 and therefore into the resistive heating element 20, the amount of electrical energy which was stored. This resistive heating element 20 then, through the Joule effect, causes the initiation of the pyrotechnic priming composition 52 and thereafter the initiation and combustion of the pyrotechnic ignition composition 16, which has the effect of fracturing the end wall 8 of the cap 4 then the glass discoid wall 60.

Furthermore, in each of the two ignition heads 2 or 3, given the mechanical strength of the discoid metal part 18, an important advantage lies in the fact that upon activation of one of these two ignition heads 2 or 3, the various electronic components associated with them are not damaged by the pressure wave that results from the initiation of the pyrotechnic priming composition 52, and the dialogue and triggering means 49 is then still able to exchange information with the electronic control unit in the next few milliseconds, particularly to let it know, for example, that this ignition head 2 or 3 has been correctly triggered.

Figure 3:
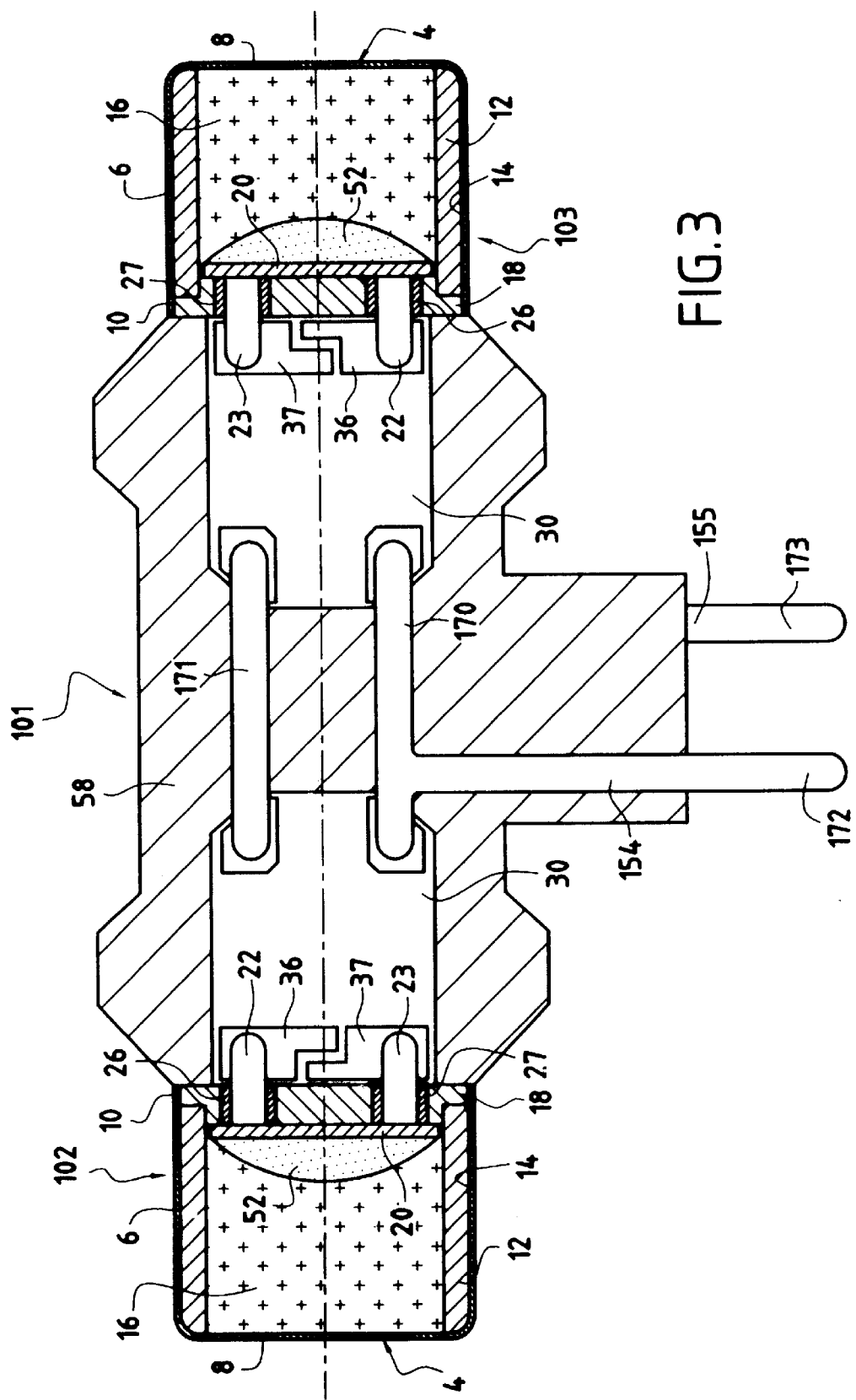
FIG. 3 is a part view in longitudinal section of an electropyrotechnic igniter equipped with two external metal pins, with the electronic components and part of the overmoulding omitted.
Figure 4:
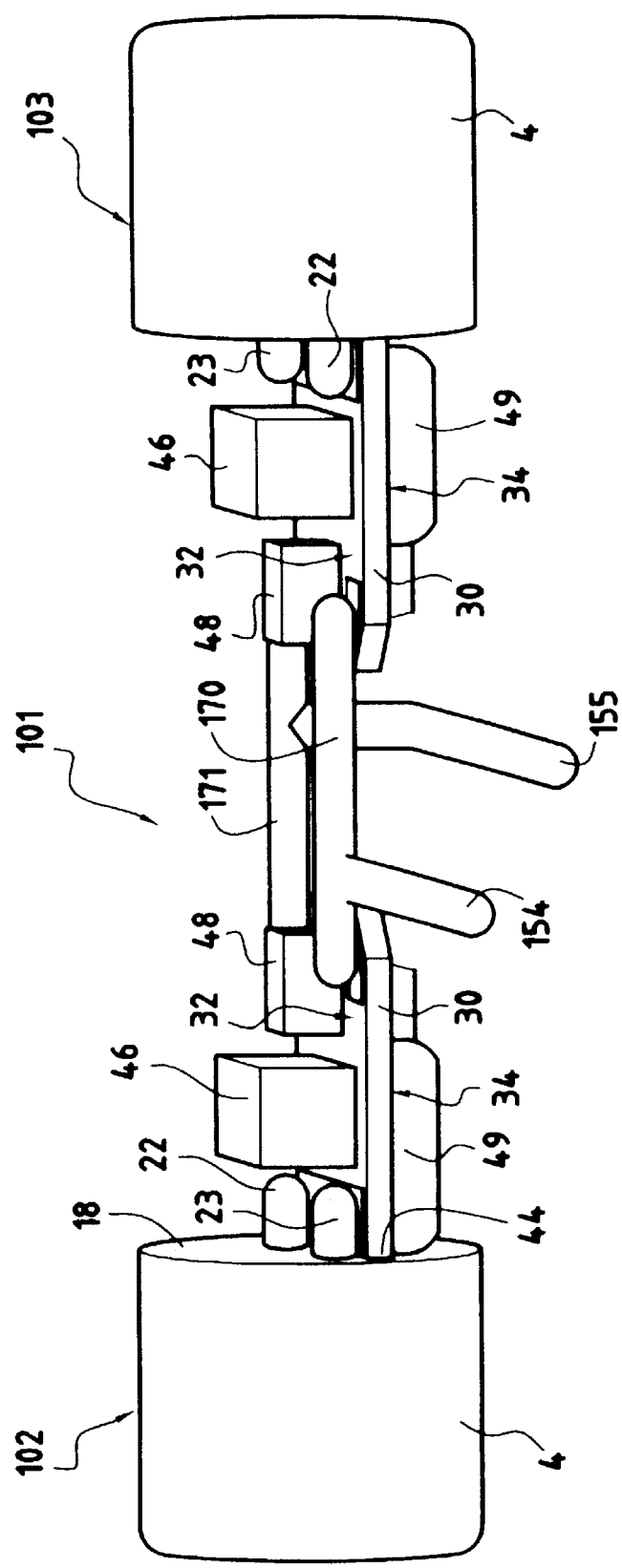
FIG. 4 is a perspective view with cutaway of the igniter depicted partly in FIG. 3, with the overmoulding omitted.

Referring to FIGS. 3 and 4, it can be seen that an igniter 101 according to the second preferred embodiment comprises two ignition heads 102, 103 and largely resembles the igniter 1 described previously. This is why, on the one hand, we have kept the same reference numbers for the technical elements which do not change and, on the other hand, only those which have changed will be described hereinbelow.

The only change lies in the connecting of the two ignition heads 102, 103 to one another. This connection is achieved using two external metal connecting pins 154, 155. More specifically, each of these two pins 154, 155 has a first part 170, 171 which lies in the continuation of the two electronic boards 30, and this part 170, 171 ends at a first end connected to the conducting tracks 36, 37 of the electronic board 30 of the ignition head 102 and at a second end connected to the conducting tracks 36, 37 of the electronic board 30 of the ignition head 103. Furthermore, each of these two pins 154, 155 has a second part 172, 173 arranged in a plane perpendicular to the plane in which the first part 170, 171 is contained and which is intended to be connected, by means of a connector, to an electronic control unit.

The way in which the igniter 101 works is entirely identical to the way described before on the subject of the igniter 1.

Referring to FIG. 5, it can be seen that an igniter 1 according to the first preferred embodiment is incorporated into a gas generator 200 which has a body 201 of elongate tubular shape equipped with a side wall 230. More specifically, two metal rings 202, 203 sit around the overmoulding 59 of the igniter 1 and this assembly thus created is fixed into the side wall 230 of the body 201 by crimping at these two rings 202, 203. The igniter 1 thus positioned makes it possible to separate, in a sealed way, an upstream compartment 204 from a downstream compartment 205. Furthermore, the side wall 230 has a central bore at the external pins 54 to 56 of the igniter 1 so as to take a connector coming from the electronic control unit. The upstream compartment 204 and the downstream compartment 205 each contain a combustion chamber 206, 207 and a pressure-reducing chamber 208, 209. The combustion chamber 206 contains a pyrotechnic charge 210 which, when initiated by activation of the ignition head 2, produces gases of combustion which, first of all, pass through a nozzle 211 borne by a partition 212 fixed by crimping in the side wall 230 then, next, escape through orifices 213 borne by the said side wall 230 into the pressure-reducing chamber 208. Likewise, the combustion chamber 207 contains a pyrotechnic charge 214 which, when initiated by activation of the ignition head 3, produces gases of combustion which, first of all, pass through a nozzle 215 borne by a partition 216 fixed by crimping in the side wall 230 then, next, escape through orifices 217 borne by the said side wall 230 into the pressure-reducing chamber 209. In FIG. 5, the combustion chamber 206 contains a greater quantity of pyrotechnic charge than the combustion chamber 207, but this could be reversed or, alternatively, the amount contained in each of the two chambers could be the same.

What is claimed is:

1. Electropyrotechnic igniter (101) with two ignition heads (102, 103), each of the said ignition heads comprising a body containing a resistive heating element (20) and a pyrotechnic ignition composition (16), wherein each of the two ignition heads comprises a means (49) of dialogue and of triggering coded information and a means (46) of storing electrical energy, the said electropyrotechnic igniter comprising external connection means (154, 155) intended to be connected electrically to an electronic control unit, in each of the two ignition heads (102, 103), a transverse dividing wall (18) splitting the interior of the body into a downstream chamber containing the resistive heating element (20) and the pyrotechnic ignition composition (16), and an upstream chamber containing an electronic board (30) onto which the dialogue and triggering means (49) and the means (46) of storing electrical energy are integrated, the external connection means consisting of two external metal pins, each of which has:

i) a first part (170,171) which lies in the continuation of the two electronic boards (30), ii) a second part (172, 173) arranged in a plane perpendicular to the plane in which the first part is contained.

2. Electropyrotechnic igniter (101) according to claim 1, wherein each of the two ignition heads (102, 103) comprises electrical connection means (22, 23), said electrical connection means passing through the transverse dividing wall and connecting the resistive heating element (20) to conducting tracks (36, 37) which are formed on the electronic board (30).

3. Electropyrotechnic igniter (101) according to claim 2, wherein, in each of the two ignition heads (102,103), the electrical connection means consists of metal connecting pins (22, 23).

4. Electropyrotechnic igniter (101) according to claim 1, wherein, the two electronic boards (30) are arranged at right angles to their respective transverse dividing wall.

5. Electropyrotechnic igniter (101) according to claim 1, wherein in each of the two ignition heads (102,103), the dialogue and triggering means (49) is placed on one of two flat faces (34) of the electronic board (30), and wherein means (46) of storing electrical energy is placed on another flat face (32) of electronic board (30).

6. Electropyrotechnic igniter (101) according to claim 1, wherein each resistive heating element consists of a thin-film resistive bridge.

7. Electropyrotechnic igniter (101) according to claim 6, wherein the thin-film resistive bridge consists of tantalum nitride, the thickness of which is between 0.01 $\mu$m and 1 $\mu$m.

8. Electropyrotechnic igniter (101) according to claim 6, wherein the thin-film resistive bridge consists of a layer of nickel/chromium alloy, the thickness of which is between 0.01 $\mu$m and 1 $\mu$m.

9. Use of an electropyrotechinc igniter (101) according to claim 1 in a gas generator which is intended to inflate an airbag and which has an elongaged tubular body (201).

* * * * *